US012567766B2

(12) United States Patent
Lin et al.

(10) Patent No.: US 12,567,766 B2
(45) Date of Patent: Mar. 3, 2026

(54) ELECTRONIC DEVICE AND PANEL WITH WIRELESS POWER FUNCTION

(71) Applicant: Novatek Microelectronics Corp., Hsinchu (TW)

(72) Inventors: Yi-Ying Lin, Hualien County (TW); Chih-Chang Lai, Taichung City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/744,670

(22) Filed: Jun. 16, 2024

(65) Prior Publication Data

US 2025/0385549 A1     Dec. 18, 2025

(51) Int. Cl.
| | |
|---|---|
| *H02J 50/12* | (2016.01) |
| *G06F 3/041* | (2006.01) |
| *G06F 3/044* | (2006.01) |
| *H02J 50/60* | (2016.01) |

(52) U.S. Cl.
CPC ............ H02J 50/12 (2016.02); G06F 3/0412 (2013.01); G06F 3/04164 (2019.05); G06F 3/041662 (2019.05); G06F 3/0418 (2013.01); G06F 3/044 (2013.01); H02J 50/60 (2016.02)

(58) Field of Classification Search
CPC ..... H02J 50/12; H02J 50/60; G06F 3/041662; G06F 3/04164; G06F 3/0412; G06F 3/0418; G06F 3/044
See application file for complete search history.

(56) References Cited

U.S. PATENT DOCUMENTS

| | | | |
|---|---|---|---|
| 9,859,310 B2 | 1/2018 | Xu et al. | |
| 11,329,508 B2 * | 5/2022 | Ren ........................ | G02F 1/1345 |
| 2012/0311363 A1 | 12/2012 | Kim et al. | |
| 2017/0047361 A1 | 2/2017 | Xu et al. | |
| 2020/0185964 A1 * | 6/2020 | Ren .................... | G02F 1/133512 |
| 2020/0343314 A1 * | 10/2020 | Nakamura ......... | H10K 59/8792 |
| 2021/0099013 A1 | 4/2021 | Tian et al. | |
| 2022/0255353 A1 | 8/2022 | Kim et al. | |
| 2023/0100463 A1 * | 3/2023 | Hosotani ............... | H02J 7/0068 235/451 |
| 2024/0030606 A1 | 1/2024 | Konanur et al. | |

FOREIGN PATENT DOCUMENTS

| | | |
|---|---|---|
| CN | 106098702 | 11/2016 |
| CN | 108508640 | 9/2018 |

OTHER PUBLICATIONS

"Office Action of Taiwan Counterpart Application", issued on Apr. 15, 2025, p. 1-p. 7.

* cited by examiner

*Primary Examiner* — Peter D McLoone
(74) *Attorney, Agent, or Firm* — JCIPRNET

(57) ABSTRACT

The disclosure provides an electronic device and a panel with a wireless power function. The panel includes multiple native wires and a wireless power coil. The wireless power coil and the native wires are arranged on the panel. A driver circuit drives the panel through the native wires to perform a native function of the panel. A power circuit performs a wireless power transmission function through the wireless power coil.

24 Claims, 7 Drawing Sheets

41

WP41

410

Power circuit

430

42

420

ELECTRONIC DEVICE AND PANEL WITH WIRELESS POWER FUNCTION

BACKGROUND

Technical Field

The disclosure relates to an electronic device, and more particularly, to a panel with a wireless power function.

Description of Related Art

Additional (independent) wireless charging coil modules are required to be used for existing electronic devices to implement wireless charging functions. The wireless charging coil modules often occupy valuable space in the electronic devices and require additional costs.

SUMMARY

The disclosure provides an electronic device and a panel with a wireless power function to implement the panel charging technology.

In an embodiment of the disclosure, the panel includes multiple native wires and a wireless power coil. The wireless power coil and the native wires are arranged on the panel. A driver circuit drives the panel through the native wires to perform a native function of the panel. A power circuit performs a wireless power transmission function through the wireless power coil.

In an embodiment of the disclosure, the electronic device includes a panel, a driver circuit, and a power circuit. The panel includes multiple native wires and a wireless power coil. The native wires and the wireless power coil are arranged on the panel. The driver circuit is coupled to the panel. The driver circuit drives the panel through the native wires to perform a native function of the panel. The power circuit is coupled to the panel. The power circuit performs a wireless power transmission function through the wireless power coil.

Based on the above, the wireless power coil according to the embodiments of the disclosure is embedded in the panel. Therefore, the electronic device may eliminate the need for an additional wireless charging coil module and implement the panel charging technology. Since there is no additional wireless charging coil module, the element space and costs for the electronic device may be reduced.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
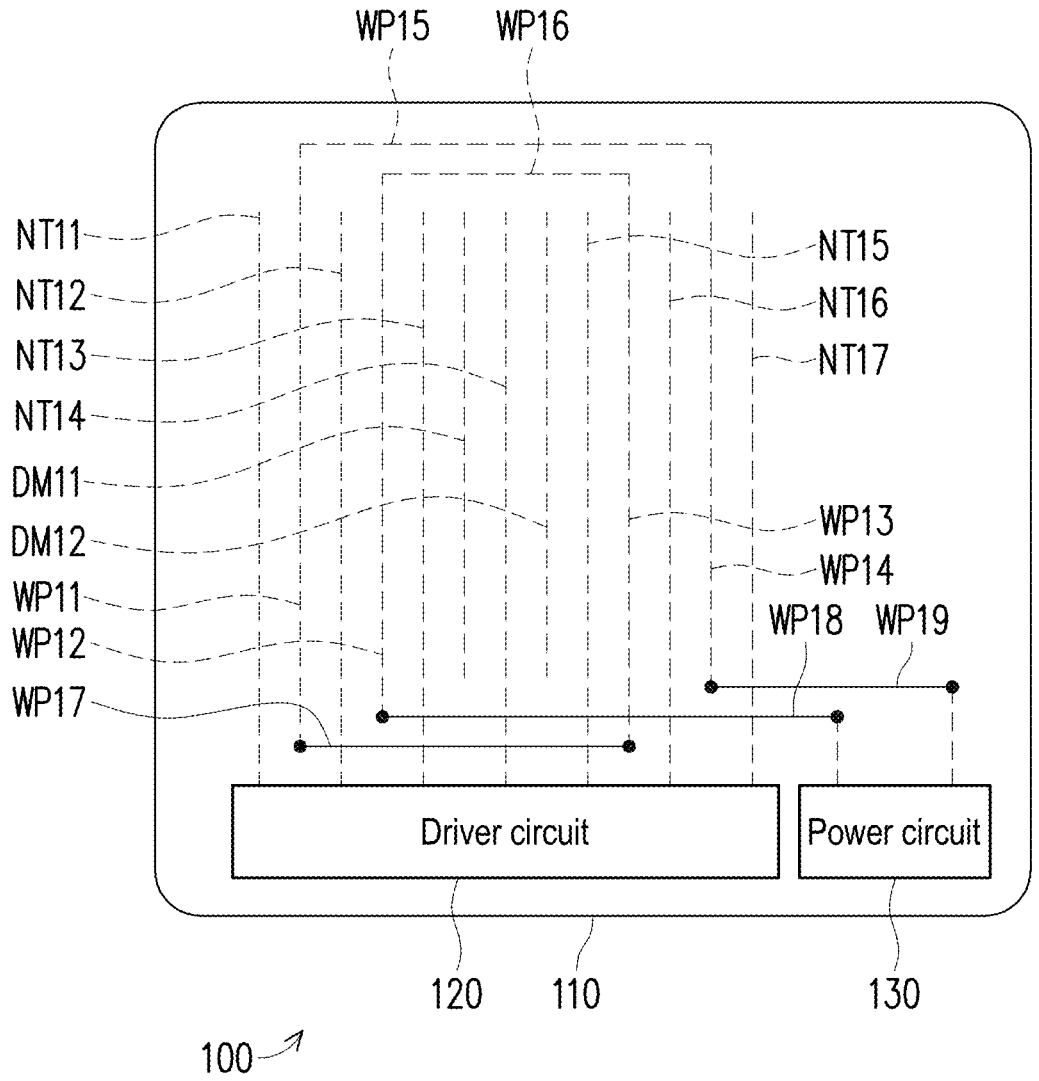
FIG. 1 is a schematic layout diagram of a panel with a wireless power function according to an embodiment of the disclosure.

The term "coupling (or connection)" as used throughout the present specification (including the claims) may refer to any direct or indirect connection means. For example, if it is described that a first device is coupled (or connected) to a second device, it should be interpreted that the first device can be directly connected to the second device, or the first device can be indirectly connected to the second device through other devices or a certain connection means. The terms "first", "second" and the like as mentioned throughout the present specification (including the claims) are used to name the elements or to distinguish between different embodiments or scopes, rather than setting an upper or lower limit on the number of the elements or the order of the elements. In addition, wherever possible, elements/components/steps with the same reference numerals in the drawings and embodiments represent the same or similar parts. Cross-reference may be made between the elements/components/steps in different embodiments that are denoted by the same reference numerals or that have the same names.

FIG. 1 is a schematic layout diagram of a panel 110 with a wireless power function according to an embodiment of the disclosure. An electronic device 100 shown in FIG. 1 includes the panel 110, a driver circuit 120, and a power circuit 130. In some embodiments, the driver circuit 120 and the power circuit 130 may be two separate integrated circuits (ICs). In other embodiments, the driver circuit 120 and the power circuit 130 may be integrated into a single IC. In the panel 110 shown in FIG. 1, solid straight lines represent a first conductive layer (a M1 layer) arranged on the panel 110, and dashed straight lines represent a second conductive layer (a M2 layer) arranged on the panel 110. The driver circuit 120 is coupled to multiple native wires of the panel 110, such as native wires NT11, NT12, NT13, NT14, NT15, NT16, and NT17 shown in FIG. 1. The native wires NT11 to NT17 are arranged on the panel 110. A space between two adjacent native wires among the native wires NT11 to NT17 may be reserved as a dummy line position. A dummy line is generally arranged at the dummy line position between the native wires NT11 to NT17, such as dummy lines DM11 and DM12. The dummy lines are for improving wiring uniformity of the panel 110. The native wires NT11 to NT17 and the dummy lines DM11 to DM12 are arranged on the second conductive layer of the panel 110. The driver circuit 120 drives the panel 110 through the native wires NT11 to NT17 to perform one (or more) native function of the panel 110.

For example (but not limited thereto), the panel 110 may be a display panel. The native wires NT11 to NT17 include multiple data wires (or multiple scan wires) of the display panel. The driver circuit 120 includes a display driver IC (integrated circuit). According to an actual design and application, the display driver integrated circuit may be a well-known display panel driver or other display panel driving circuits. The driver circuit 120 drives the display panel 110 through the native wires NT11 to NT17 (the data wires or the scan wires) to perform a display function (the native function) of the display panel 110.

For another example, the panel 110 may be a touch panel. The native wires NT11 to NT17 include multiple touch signal transmission wires of the touch panel. The driver circuit 120 includes a touch driver integrated circuit. According to the actual design and application, the touch driver integrated circuit may be a well-known touch panel driver or other touch panel driving circuits. The driver circuit 120 drives the touch panel 110 through the native wires NT11 to NT17 (the touch signal transmission wires) to perform a touch sensing function (the native function) of the touch panel 110.

For still another example, the panel 110 may be a touch display panel. The native wires NT11 to NT17 include multiple touch signal transmission wires of the touch display panel. The driver circuit 120 includes a touch with display driver IC (TDDI). The driver circuit 120 drives the touch display panel 110 through the native wires NT11 to NT17 to perform the native function (the touch sensing function and the display function) of the touch display panel 110. In the touch display panel, a common voltage (Vcom) electrode (not shown in the drawing) is generally arranged on the first conductive layer of the touch display panel.

A wireless power coil is arranged on the panel 110. In the embodiment shown in FIG. 1, the wireless power coil includes first line segments WP11, WP12, WP13, and WP14 extending along a first direction (e.g., a longitudinal direction in FIG. 1) as well as second line segments WP15 and WP16 and third line segments WP17, WP18, and WP19 extending in a second direction (e.g., a transverse direction in FIG. 1). The first line segments WP11 to WP14 and the second line segments WP15 to WP16 are arranged on the second conductive layer of the panel 110. The third line segments WP17 to WP19 are arranged on the first conductive layer of the panel 110. Any one of the first line segments WP11 to WP14 is arranged at a corresponding dummy line position among the dummy line positions between the native wires NT11 to NT17 (e.g., the touch signal transmission wires). The power circuit 130 is coupled to the wireless power coil of the panel 110. The power circuit 130 performs at least one of a wireless power transmitter function and a wireless power receiver function through the wireless power coil formed by the first line segments WP11 to WP14, the second line segments WP15 to WP16, and the third line segments WP17 to WP19.

Based on the above, in the embodiment shown in FIG. 1, the wireless power coil is arranged on the first conductive layer and the second conductive layer of the panel 110. Therefore, embedding of the wireless power coils does not require an additional process mask. Since the wireless power coil is embedded in the panel 110, the electronic device 100 does not require an additional wireless charging coil module and implements the panel charging technology. Since there is no additional wireless charging coil module, the element space and costs for the electronic device 100 may be reduced.

Figure 2:
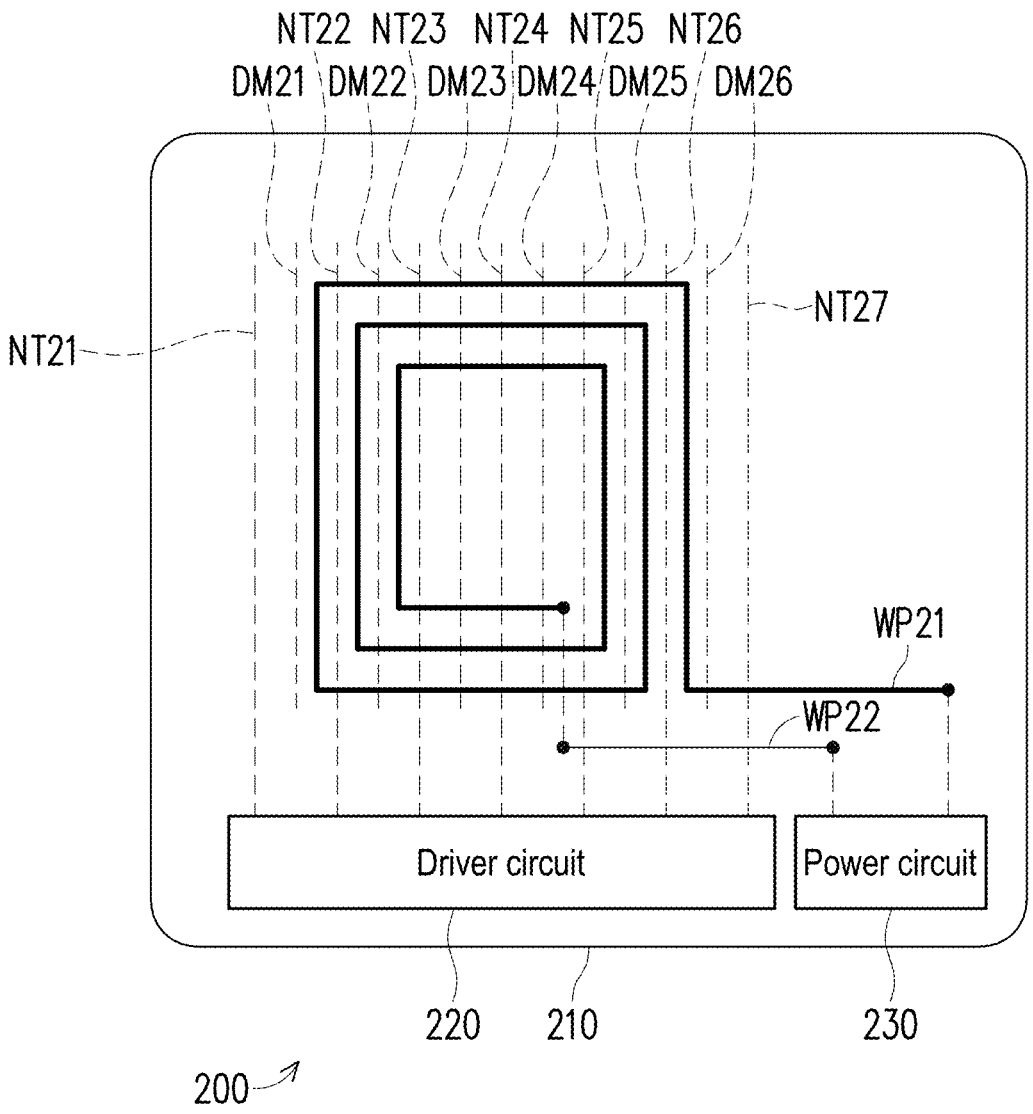
FIG. 2 is a schematic layout diagram of a panel with a wireless power function according to another embodiment of the disclosure.

FIG. 2 is a schematic layout diagram of a panel 210 with a wireless power function according to another embodiment of the disclosure. An electronic device 200 shown in FIG. 2 includes the panel 210, a driver circuit 220, and a power circuit 230. In the panel 210 shown in FIG. 2, thin solid lines represent the first conductive layer (the M1 layer) arranged on the panel 210, dashed lines represent the second conductive layer (the M2 layer) arranged on the panel 210, and thick solid lines represent a third conductive layer (a M3 layer) arranged on the panel 210. Relevant descriptions of the driver circuit 120 shown in FIG. 1 may be referred for the driver circuit 220 shown in FIG. 2, and may be derived by analogy. Relevant descriptions of the panel 110 shown in FIG. 1 may be referred for the panel 210 shown in FIG. 2, and may be derived by analogy. Relevant descriptions of the native wires NT11 to NT17 shown in FIG. 1 may be referred for native wires NT21, NT22, NT23, NT24, NT25, NT26, and NT27 shown in FIG. 2, and may be derived by analogy. Relevant descriptions of the dummy lines DM11 and DM12 shown in FIG. 1 may be referred for dummy wires DM21, DM22, DM23, DM24, DM25, and DM26 shown in FIG. 2, and may be derived by analogy. Therefore, the same details will not be repeated in the following. The native wires NT21 to NT27 and the dummy wires DM21 to DM26 are arranged on the second conductive layer of the panel 210. The driver circuit 220 drives the panel 210 through the native wires NT21 to NT27 to perform one (or more) native function of the panel 210, such as the display function and/or the touch sensing function.

In the embodiment shown in FIG. 1, the wireless power coil is arranged on the first conductive layer and the second conductive layer of the panel 110. A difference from the embodiment shown in FIG. 1 is that in the embodiment shown in FIG. 2, a wireless power coil WP21 is arranged on the third conductive layer of the panel 210. Therefore, a layout of the wireless power coil WP21 will not interfere with a layout of other conductive layers of the panel 210. The power circuit 230 is coupled to the wireless power coil WP21 of the panel 210. A connection wire WP22 coupled between the wireless power coil WP21 and the power circuit 230 is arranged on the first conductive layer of the panel 210. In other embodiments, the connection wire WP22 may be arranged on the third conductive layer. The power circuit 230 performs at least one of the wireless power transmitter function and the wireless power receiver function through the wireless power coil WP21. Since the wireless power coil WP21 is embedded in the panel 210, the electronic device 200 does not require an additional wireless charging coil module and implements the panel charging technology. Since there is no additional wireless charging coil module, the element space and costs for the electronic device 200 may be reduced.

Figure 3:
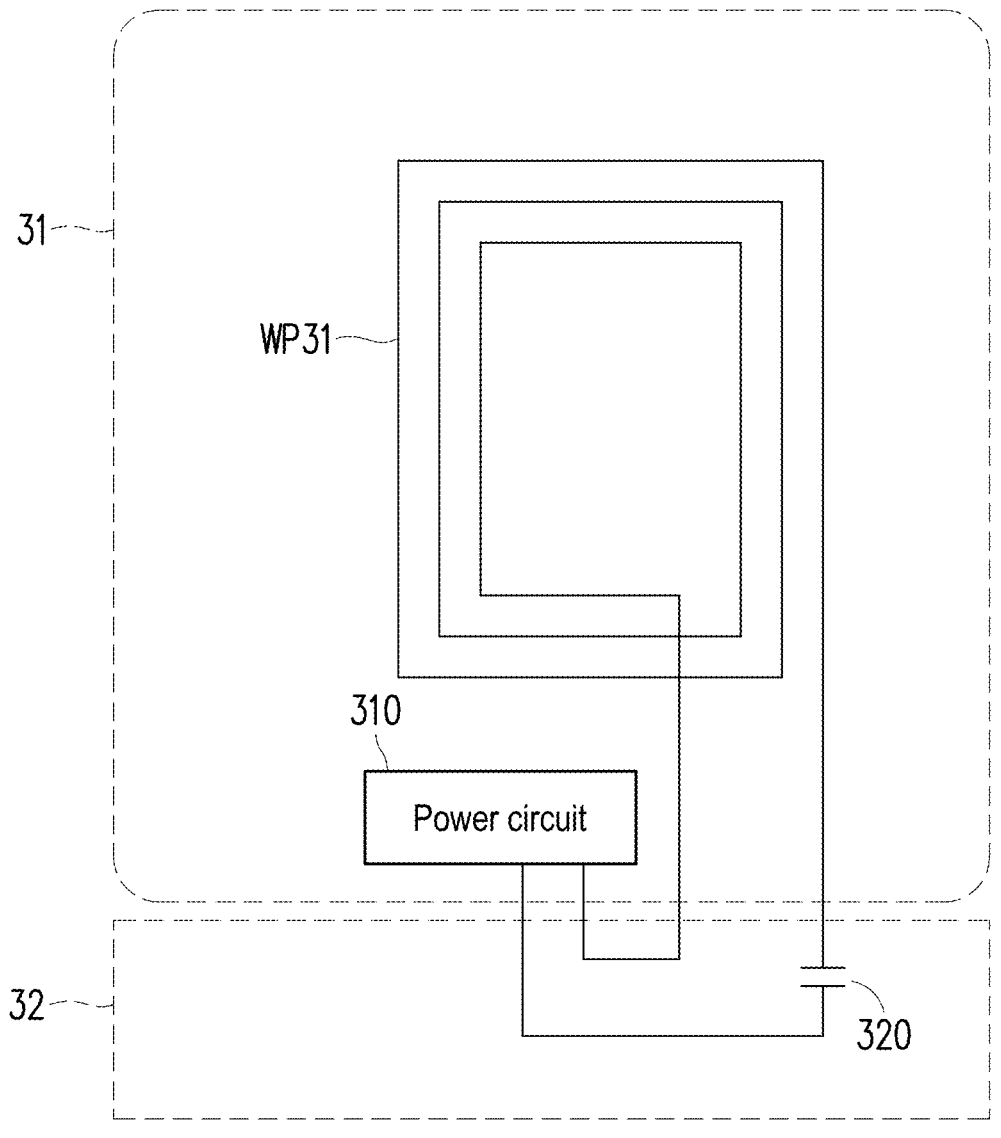
FIG. 3 is a schematic circuit block diagram of a resonant circuit according to an embodiment of the disclosure.

FIG. 3 is a schematic circuit block diagram of a resonant circuit according to an embodiment of the disclosure. A wireless power coil WP31 shown in FIG. 3 is embedded in a panel 31. Relevant descriptions of the wireless power coil (the first line segments WP11 to WP14, the second line segments WP15 to WP16, and third line segments WP17 to WP19) and the panel 110 shown in FIG. 1 may be referred for the wireless power coil WP31 and the panel 31 shown in FIG. 3 and may be derived by analogy, or reference is made to relevant descriptions of the wireless power coil WP21 and the panel 210 shown in FIG. 2 and may be derived by analogy. Therefore, the same details will not be repeated in the following.

The resonant circuit shown in FIG. 3 includes a power circuit 310 and a resonant capacitor 320. The relevant descriptions of the power circuit 130 shown in FIG. 1 or the power circuit 230 shown in FIG. 2 may be referred for the power circuit 310 shown in FIG. 3. A first end of the wireless power coil WP31 is coupled to a first end of the power circuit 310. A second end of the wireless power coil WP31 is coupled to a second end of the power circuit 310 through the resonant capacitor 320. As an example (but not limited to this), the power circuit 310 is arranged on the panel 31, and the resonant capacitor 320 is arranged on a printed circuit board 32. The printed circuit board 32 may be a flexure circuit board (FPC) or other printed circuit boards. The power circuit 310 includes a half-bridge circuit and other power supply circuits. The power circuit 310 provides wireless power to another electronic device (not shown) through the wireless power coil WP31.

Figure 4:
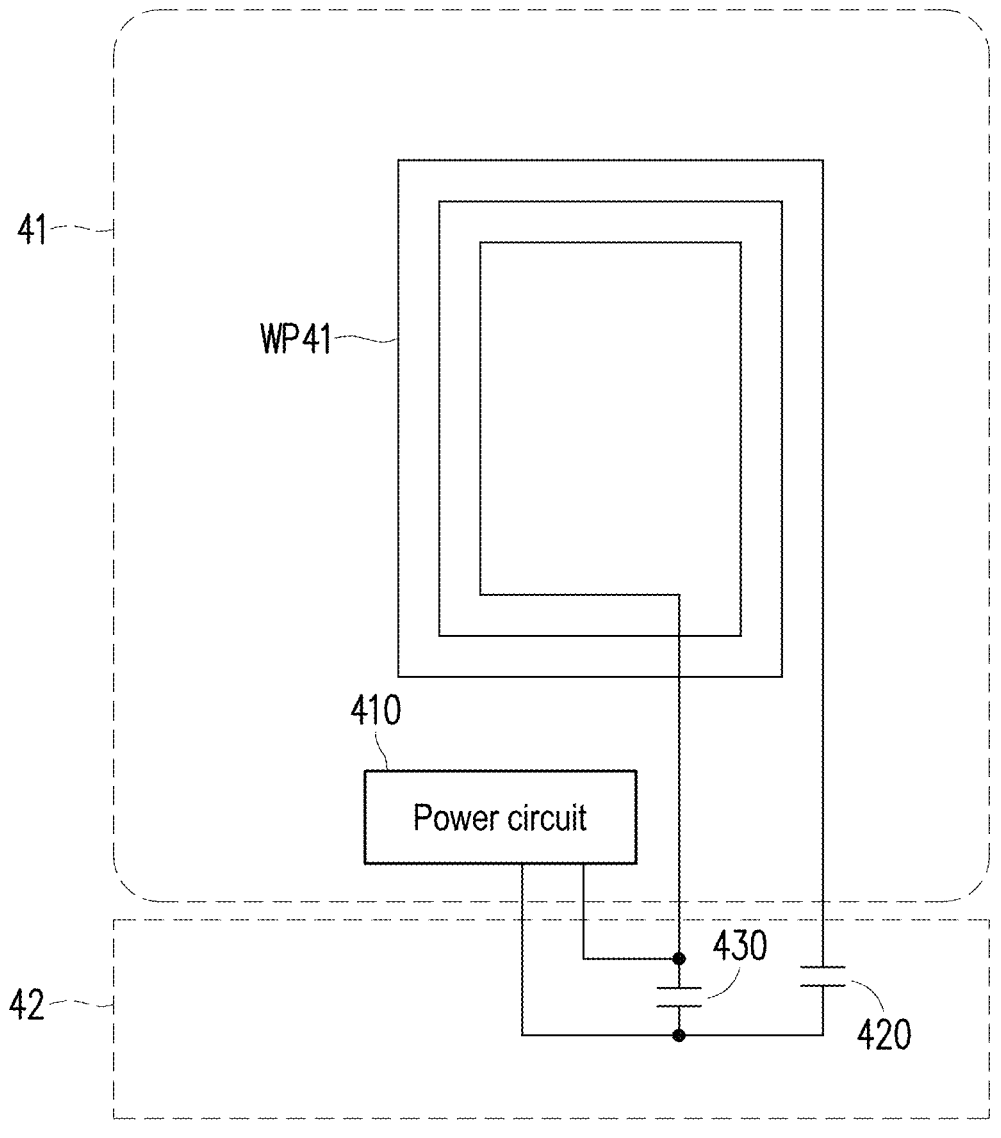
FIG. 4 is a schematic circuit block diagram of a resonant circuit according to another embodiment of the disclosure.

FIG. 4 is a schematic circuit block diagram of a resonant circuit according to another embodiment of the disclosure. A wireless power coil WP41 shown in FIG. 4 is embedded in a panel 41. The relevant descriptions of the wireless power coil (the first line segments WP11 to WP14, the second line segments WP15 to WP16, and third line segments WP17 to WP19) and the panel 110 shown in FIG. 1 may be referred for the wireless power coil WP41 and the panel 41 shown in FIG. 4 and may be derived by analogy, or reference is made to relevant descriptions of the wireless power coil WP21 and the panel 210 shown in FIG. 2 and may be derived by analogy. Therefore, the same details will not be repeated in the following.

The resonant circuit shown in FIG. 4 includes a power circuit 410 coupled to a resonant capacitor 420 and a resonant capacitor 430. The relevant descriptions of the power circuit 130 shown in FIG. 1 or the power circuit 230 shown in FIG. 2 may be referred for the power circuit 410 shown in FIG. 4. A first end of the wireless power coil WP41 is coupled to a first end of the power circuit 410. A second end of the wireless power coil WP41 is coupled to a second end of the power circuit 410 through the resonant capacitor 420. The resonant capacitor 430 is coupled between the first end and the second end of the power circuit 410. As an example (but not limited to this), the power circuit 410 is arranged on the panel 41, and the resonant capacitors 420 and 430 are arranged on a printed circuit board 42. The printed circuit board 42 may be a flexure circuit board (FPC) or other printed circuit boards. The power circuit 410 includes a full bridge circuit and other power conversion circuits. The power circuit 410 receives wireless power from another electronic device (not shown) through the wireless power coil WP41.

Figure 5:
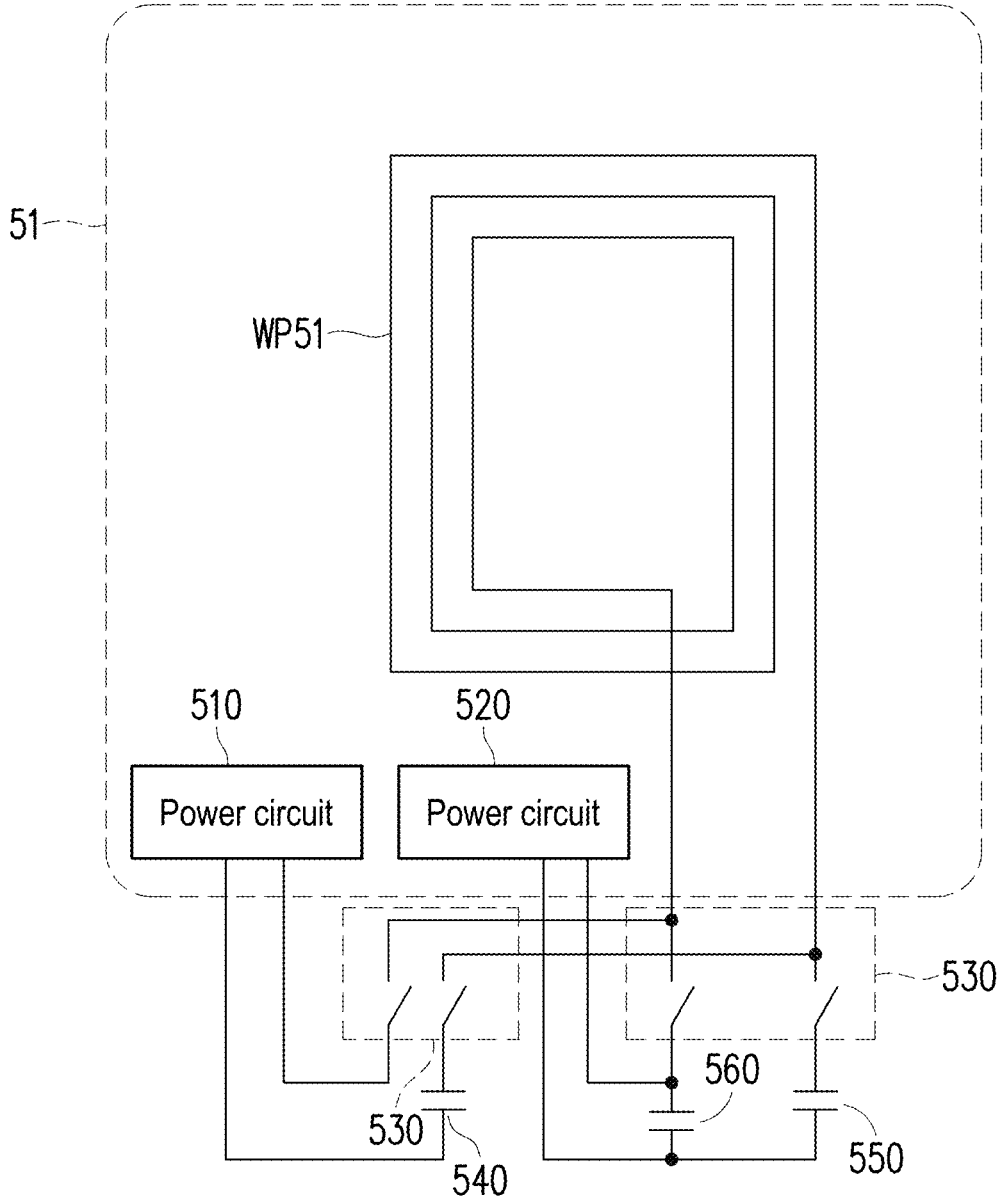
FIG. 5 is a schematic circuit block diagram of a resonant circuit according to still another embodiment of the disclosure.

FIG. 5 is a schematic circuit block diagram of a resonant circuit according to still another embodiment of the disclosure. A wireless power coil WP51 shown in FIG. 5 is embedded in a panel 51. The relevant descriptions of the wireless power coil (the first line segments WP11 to WP14, the second line segments WP15 to WP16, and third line segments WP17 to WP19) and the panel 110 shown in FIG. 1 may be referred for the wireless power coil WP51 and the panel 51 shown in FIG. 5 and may be derived by analogy, or reference is made to relevant descriptions of the wireless power coil WP21 and the panel 210 shown in FIG. 2 and may be derived by analogy. Therefore, the same details will not be repeated in the following.

The resonant circuit shown in FIG. 5 includes a power circuit 510, a power circuit 520, a path switch circuit 530, and resonant capacitors 540, 550, 560. The wireless power coil WP51 is selectively coupled to the power circuit 510 or the power circuit 520 via the path switch circuit 530. For example, a first end and a second end of the wireless power coil WP51 are coupled to a first end and a second end of the path switch circuit 530 respectively. A first end of the power circuit 510 is coupled to a third end of the path switch circuit 530. A first end of the power circuit 520 is coupled to a fourth end of the path switch circuit 530. A first end of the resonant capacitor 540 is coupled to a fifth end of the path switch circuit 530. A second end of the resonant capacitor 540 is coupled to a second end of the power circuit 510. A first end of the resonant capacitor 550 is coupled to a sixth end of the path switch circuit 530. A second end of the resonant capacitor 550 is coupled to a second end of the power circuit 520. A first end of the resonant capacitor 560 is coupled to the first end of the power circuit 520 and the fourth end of the path switch circuit 530. A second end of the resonant capacitor 560 is coupled to the second end of the resonant capacitor 550 and the second end of the power circuit 520.

As an example (but not limited to this), the power circuit 510 and the power circuit 520 are arranged on the panel 51, but in other embodiments, the power circuit 510 and the power circuit 520 are arranged on a printed circuit board. In some implementation scenarios, the path switch circuit 530 is arranged on the panel 51, and the resonant capacitors 540, 550, and 560 are arranged on the printed circuit board. In other implementation scenarios, the path switch circuit 530 and the resonant capacitors 540, 550, and 560 are arranged on the printed circuit board. For the power circuit 510 shown in FIG. 5, reference may be made to the related description of the power circuit 310 shown in FIG. 3. The power circuit 510 provides wireless power to another electronic device (not shown) through the path switch circuit 530 and the wireless power coil WP51. For the power circuit 520 shown in FIG. 5, reference may be made to the related description of the power circuit 410 shown in FIG. 4. The power circuit 520 receives wireless power from another electronic device (not shown) through the path switch circuit 530 and the wireless power coil WP51.

In detail, in response to the electronic device operated in a wireless power source mode, the first end of the wireless power coil WP51 is coupled to the first end of the power circuit 510 through the path switch circuit 530, and the second end of the wireless power coil WP51 is coupled to the first end of the resonant capacitor 540 through the path switch circuit 530. Therefore, the power circuit 510 may perform the wireless power transmission function through the wireless power coil WP51. In response to the electronic device operated in a wireless power receiving mode, the first end of the wireless power coil WP51 is coupled to the first end of the power circuit 520 and the first end of the resonant capacitor 560 through the path switch circuit 530, and the second end of the wireless power coil WP51 is coupled to the first end of the resonant capacitor 550 through the path switch circuit 530. Therefore, the power circuit 520 may perform the wireless power transmission function through the wireless power coil WP51.

Figure 6:
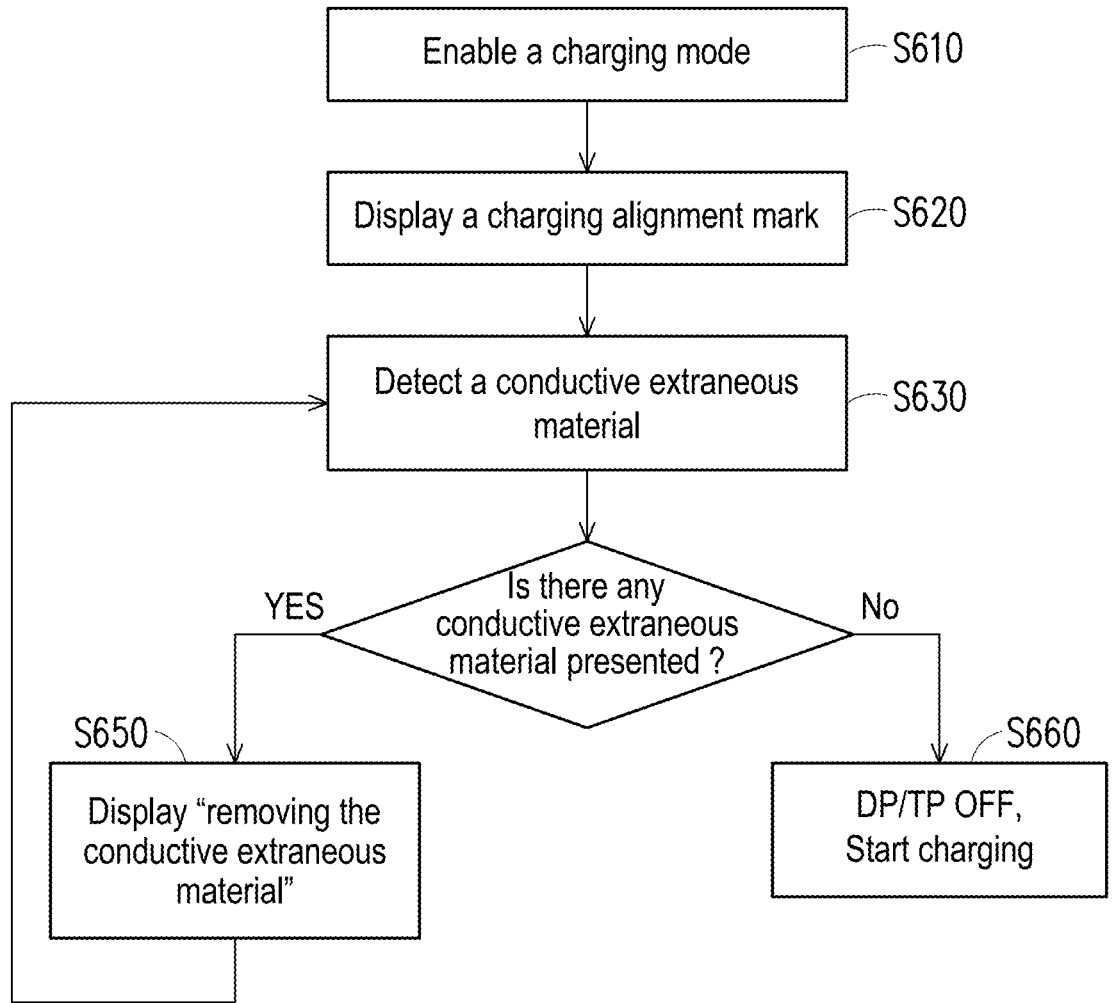
FIG. 6 is a schematic diagram of an operation flow of a wireless charging mode according to an embodiment of the disclosure.

FIG. 6 is a schematic diagram of an operation flow of a wireless charging mode according to an embodiment of the disclosure. In step S610, a user may operate a user interface of the electronic device to enable the charging mode. In response to the wireless charging mode, the touch with display driver IC may drive the touch display panel to display a charging alignment mark at a position corresponding to the wireless power coil (step S620), so as to prompt the user to place the wireless power receiver in a correct position of the touch display panel. The charging alignment mark may improve alignment accuracy of the coil.

In response to the electronic device operated in the wireless charging mode, in step S630, the power circuit detects whether there is a conductive extraneous material at the position of the wireless power coil. Step S630 may use one or more detection methods to determine whether there is a conductive extraneous material presented at the position. For example, in step S630, the touch with display driver IC detects the position corresponding to the wireless power coil through the touch display panel to determine whether there is a conductive extraneous material presented at the position. Alternatively, step S630 may use the detection means shown in FIG. 7 to detect a conductive extraneous material. For another example, the power circuit may detect a conductive extraneous material through the wireless power coil in step S630. This embodiment does not limit the detection method of the power circuit through the wireless power coil. For example, the power circuit may also perform well-known conductive extraneous material detection (e.g., the conductive extraneous material detection specified by the wireless charging standard Qi) or other determination processing on the conductive extraneous material in step S630. Qi is a wireless charging standard developed by WPC (Wireless Power Consortium).

In response to the touch with display driver IC determining that there is a conductive extraneous material at the position of the wireless power coil (a determination result indicates "Yes"), the touch with display driver IC drives the touch display panel to display a warning message (step S650), for example, displaying a prompt text of "removing the conductive extraneous material". The touch with display driver IC returns to step S630 to continue detecting conductive extraneous material.

In response to the touch with display driver IC determining that there is no conductive extraneous material at the position of the wireless power coil (the determination result indicates "No"), the touch with display driver IC proceeds to step S660. In step S660, the touch with display driver IC notifies the power circuit to perform a wireless power supply operation in the wireless charging mode (serving as the wireless power source to supply wireless power to other electronic devices). Display processing (DP) and touch processing (TP) may be suspended while the wireless charging is started.

Figure 7:
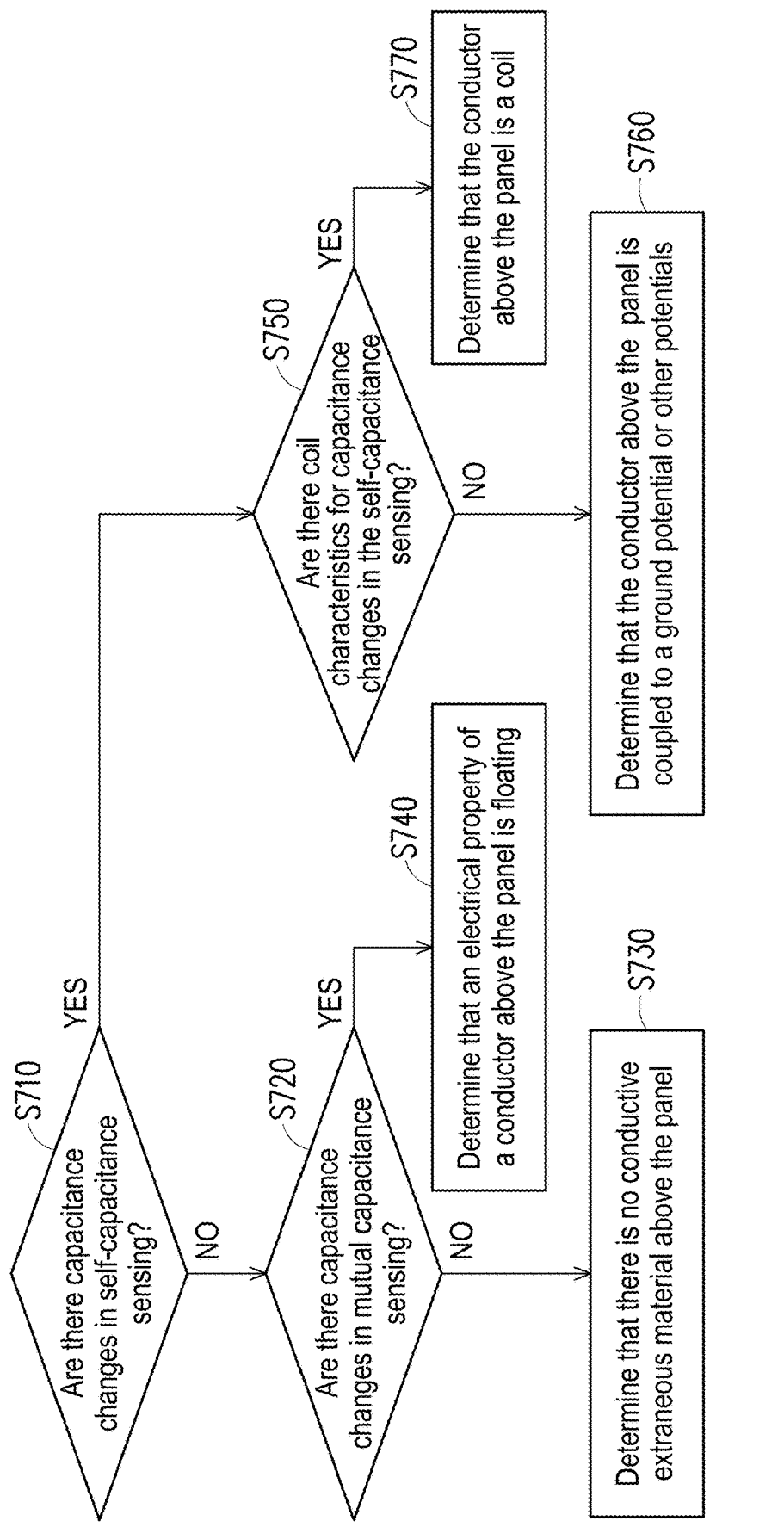
FIG. 7 is a schematic diagram of an operation flow of a touch display panel detecting presence of a conductive extraneous material according to an embodiment of the disclosure.

FIG. 7 is a schematic diagram of an operation flow of a touch display panel detecting presence of a conductive extraneous material according to an embodiment of the disclosure. The flow shown in FIG. 7 may be used as one of many implementation examples of step S630 shown in FIG. 6. In step S710 shown in FIG. 7, the touch with display driver IC performs self-capacitance sensing to obtain a self-capacitance sensing result. In step S720, the touch with display driver IC performs mutual capacitance sensing to obtain a mutual capacitance sensing result. The touch with display driver IC determines whether there is a conductive extraneous material at the position of the wireless power coil based on the self-capacitance sensing result and the mutual capacitance sensing result.

In response to the self-capacitance sensing result in step S710 indicating that no object is detected (a determination result in step S710 is "No"), the touch with display driver IC drives the touch display panel to perform the mutual capacitance sensing in step S720. In response to both the self-capacitance sensing result and the mutual capacitance sensing result indicating that no object is detected (a determination result in step S720 is "No"), the touch with display driver IC determines that there is no conductive extraneous material at the position of the wireless power coil (step S730). In response to the self-capacitance sensing result indicating that no object is detected but the mutual capacitance sensing result indicating that an object is detected (the determination result in step S720 is "Yes"), the touch with display driver IC determines that an electrical property of a conductor above the touch display panel is floating (step S740). That is, there is a conductive extraneous material at the position of the wireless power coil.

In step S750, the touch with display driver IC determines whether there are coil characteristics for capacitance changes in the self-capacitance sensing. If there are no coil characteristic for the capacitance changes in the self-capacitance sensing, the touch with display driver IC determines that the conductor above the touch display panel is coupled to a ground potential or other potentials (step S760). If there are coil characteristics for the capacitance changes in the self-capacitance sensing, the touch with display driver IC determines that the conductor above the touch display panel is a coil (step S770). After step S770, the touch with display driver IC may proceed to step S660.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A panel with a wireless power function, comprising:
a plurality of native wires arranged in the panel, wherein a driver circuit drives the panel through the native wires to perform a native function of the panel; and
a wireless power coil arranged in the panel, wherein a power circuit performs a wireless power transmission function through the wireless power coil, at least one common voltage electrode is arranged in a first conductive layer of the panel, the touch signal transmission wires are arranged on a second conductive layer of the panel, and the wireless power coil is arranged in a third conductive layer of the panel,
wherein the first conductive layer, the second conductive layer, and the third conductive layer are physically separated and distinct from with each other.

2. The panel according to claim 1, wherein the panel is a display panel, the native wires comprise a plurality of data wires or a plurality of scan wires of the display panel, the driver circuit comprises a display driver integrated circuit, and the native function comprises a display function of the display panel.

3. The panel according to claim 1, wherein the panel is a touch panel, the native wires comprise a plurality of touch signal transmission wires of the touch panel, the driver circuit comprises a touch driver integrated circuit, and the native function comprises a touch sensing function of the touch panel.

4. The panel according to claim 1, wherein the panel is a touch display panel, the native wires comprise a plurality of touch signal transmission wires of the touch display panel, the driver circuit comprises a touch with display driver integrated circuit, and the native function comprises a touch sensing function and a display function of the touch display panel.

5. The panel according to claim 4, wherein the wireless power coil comprises at least one first line segment extending along a first direction, and any one of the at least one first line segment is arranged at a corresponding dummy line position among a plurality of dummy line positions between the touch signal transmission wires.

6. An electronic device, comprising:
a panel comprising a plurality of native wires and a wireless power coil, wherein the native wires and the wireless power coil are arranged in the panel, at least one common voltage electrode is arranged in a first conductive layer of the panel, the touch signal transmission wires are arranged in a second conductive layer of the panel, and the wireless power coil is arranged in a third conductive layer of the panel, wherein the first conductive layer, the second conductive layer, and the third conductive layer are physically separated and distinct from with each other;

a driver circuit coupled to the panel, wherein the driver circuit drives the panel through the native wires to perform a native function of the panel; and a power circuit coupled to the panel, wherein the power circuit performs a wireless power transmission function through the wireless power coil.

7. The electronic device according to claim 6, wherein the panel is a display panel, the native wires comprise a plurality of data wires or a plurality of scan wires of the display panel, the driver circuit comprises a display driver integrated circuit, and the native function comprises a display function of the display panel.

8. The electronic device according to claim 6, wherein the panel is a touch panel, the native wires comprise a plurality of touch signal transmission wires of the touch panel, the driver circuit comprises a touch driver integrated circuit, and the native function comprises a touch sensing function of the touch panel.

9. The electronic device according to claim 6, wherein the panel is a touch display panel, the native wires comprise a plurality of touch signal transmission wires of the touch display panel, the driver circuit comprises a touch with display driver integrated circuit, and the native function comprises a touch sensing function and a display function of the touch display panel.

10. The electronic device according to claim 9, wherein in response to the electronic device operated in a wireless power source mode, the touch with display driver integrated circuit drives the touch display panel to display a charging alignment mark at a position corresponding to the wireless power coil.

11. The electronic device according to claim 9, wherein in response to the electronic device operated in a wireless power source mode, the touch with display driver integrated circuit detects a position corresponding to the wireless power coil on the touch display panel to determine whether there is a conductive extraneous material at the position.

12. The electronic device according to claim 11, wherein an operation of detecting whether there is the conductive extraneous material at the position comprises:

performing self-capacitance sensing by the touch with display driver integrated circuit to obtain a self-capacitance sensing result;

performing a mutual capacitance sensing by the touch with display driver integrated circuit to obtain a mutual capacitance sensing result; and determining whether there is the conductive extraneous material at the position by the touch with display driver integrated circuit based on the self-capacitance sensing result and the mutual capacitance sensing result.

13. The electronic device according to claim 12, wherein the operation of detecting whether there is the conductive extraneous material at the position further comprises:

in response to the self-capacitance sensing result indicating that no object is detected, driving the touch display panel by the touch with display driver integrated circuit to perform the mutual capacitance sensing;

in response to both the self-capacitance sensing result and the mutual capacitance sensing result indicating that no object is detected, determining that the conductive extraneous material is not at the position by the touch with display driver integrated circuit; and in response to the self-capacitance sensing result indicating that no object is detected but the mutual capacitance sensing result indicating that an object is detected, determining that there is the conductive extraneous material at the position by the touch with display driver integrated circuit.

14. The electronic device according to claim 11, wherein in response to the touch with display driver integrated circuit determining that there is the conductive extraneous material at the position, the touch with display driver integrated circuit drives the touch display panel to display a warning message.

15. The electronic device according to claim 11, wherein in response to the touch with display driver integrated circuit determining that the conductive extraneous material is not at the location, the touch with display driver integrated circuit notifies the power circuit to perform a wireless power supply operation in the wireless power source mode.

16. The electronic device according to claim 9, wherein the wireless power coil comprises at least one first line segment extending along a first direction, and any one of the at least one first line segment is arranged at a corresponding dummy line position among a plurality of dummy line positions between the touch signal transmission wires.

17. The electronic device according to claim 6, wherein a first end of the wireless power coil is coupled to a first end of the power circuit, and a second end of the wireless power coil is coupled to a second end of the power circuit through a resonant capacitor.

18. The electronic device according to claim 17, wherein the driver circuit and the power circuit are arranged on the panel, and the resonant capacitor is arranged on a printed circuit board.

19. The electronic device according to claim 6, wherein a first end of the wireless power coil is coupled to a first end of the power circuit, a second end of the wireless power coil is coupled to a second end of the power circuit through a first resonant capacitor, and a second resonant capacitor is coupled between the first end and the second end of the power circuit.

20. The electronic device according to claim 19, wherein the driver circuit and the power circuit are arranged on the panel, and the first resonant capacitor and the second resonant capacitor are arranged on a printed circuit board.

21. The electronic device according to claim 6, wherein the power circuit includes a first power circuit and a second power circuit, the wireless power coil is selectively coupled to the first power circuit or the second power circuit via a path switch circuit.

22. The electronic device according to claim 21, wherein in response to the electronic device operated in a wireless power source mode, a first end of the wireless power coil is selected to be coupled to a first end of the first power circuit, and a second end of the wireless power coil is selected to be coupled to a second end of the first power circuit through a first resonant capacitor; and in response to the electronic device operated in a wireless power receiving mode, the first end of the wireless power coil is selected to be coupled to a first end of the second power circuit, the second end of the wireless power coil is selected to be coupled to a second end of the second power circuit through a second resonant capacitor, and a third resonant capacitor is coupled between the first end and the second end of the second power circuit.

23. The electronic device according to claim 22, wherein the driver circuit, the first power circuit, the second power circuit, and the path switch circuit are arranged on the panel, and the first resonant capacitor, the second resonant capacitor, and the third resonant capacitor are arranged on a printed circuit board.

24. The electronic device according to claim 22, wherein the driver circuit, the first power circuit, and the second power circuit are arranged on the panel, and the path switch circuit, the first resonant capacitor, the second resonant capacitor, and the third resonant capacitor are arranged on a printed circuit board.

* * * * *